US010733879B2

(12) United States Patent
Masuike et al.

(10) Patent No.: US 10,733,879 B2
(45) Date of Patent: Aug. 4, 2020

(54) ROADSIDE DEVICE, METHOD OF CONTROLLING ROADSIDE DEVICE AND NON-TRANSITORY STORAGE MEDIUM

(71) Applicant: KYOCERA Corporation, Kyoto (JP)

(72) Inventors: Isao Masuike, Machida (JP); Hideki Morita, Yokohama (JP); Koutaro Yamauchi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/361,346

(22) Filed: Mar. 22, 2019

(65) Prior Publication Data

US 2019/0221115 A1 Jul. 18, 2019

Related U.S. Application Data

(63) Continuation of application No. PCT/JP2017/034085, filed on Sep. 21, 2017.

(30) Foreign Application Priority Data

Sep. 27, 2016 (JP) .................. 2016-188596

(51) Int. Cl.
*G08G 1/07* (2006.01)
*G08G 1/005* (2006.01)
*B60R 21/00* (2006.01)
*G08G 1/16* (2006.01)
*G08G 1/09* (2006.01)

(52) U.S. Cl.
CPC .............. *G08G 1/07* (2013.01); *B60R 21/00* (2013.01); *G08G 1/005* (2013.01); *G08G 1/09* (2013.01); *G08G 1/16* (2013.01)

(58) Field of Classification Search
CPC ............ G08G 1/07; G08G 1/005; G08G 1/09; G08G 1/01; B60R 21/00
USPC ......................................... 340/944
See application file for complete search history.

(56) References Cited

U.S. PATENT DOCUMENTS

| 10,024,684 | B2 * | 7/2018 | Wang ..................... G01C 21/32 |
| 2010/0100324 | A1 | 4/2010 | Caminiti et al. |
| 2013/0325943 | A1 * | 12/2013 | Al-Harthi .............. G06Q 50/01 |
| | | | 709/204 |
| 2015/0179066 | A1 * | 6/2015 | Rider ...................... G08G 1/04 |
| | | | 701/31.5 |

FOREIGN PATENT DOCUMENTS

| JP | 2007-334449 A | 12/2007 |
| JP | 2009-023560 A | 2/2009 |
| JP | 2009-252024 A | 10/2009 |
| JP | 2010-102437 A | 5/2010 |
| JP | 2010-108403 A | 5/2010 |
| JP | 2015-169505 A | 9/2015 |
| KR | 10-1354049 B1 | 2/2014 |

* cited by examiner

*Primary Examiner* — Eric Blount
(74) *Attorney, Agent, or Firm* — Studebaker & Brackett PC

(57) ABSTRACT

A roadside device includes a detector configured to detect information for determining a state of a sidewalk around the roadside device, a communication unit configured to communicate with other device, and at least one processor. The at least one processor is configured to determine the state of the sidewalk around the roadside device based on the information and transmit the determined state of the sidewalk to the other device.

16 Claims, 5 Drawing Sheets

ROADSIDE DEVICE, METHOD OF CONTROLLING ROADSIDE DEVICE AND NON-TRANSITORY STORAGE MEDIUM

CROSS-REFERENCE TO RELATED APPLICATION

The present application is a continuation based on PCT Application No. PCT/JP2017/034085 filed on Sep. 21, 2017, which claims the benefit of Japanese Application No. 2016-188596, filed on Sep. 27, 2016. PCT Application No. PCT/JP2017/034085 is entitled "ROADSIDE MACHINE, ROADSIDE MACHINE CONTROL METHOD AND ROADSIDE MACHINE CONTROL PROGRAM", and Japanese Application No. 2016-188596 is entitled "ROADSIDE DEVICE, ROADSIDE MACHINE CONTROL METHOD AND ROADSIDE DEVICE CONTROL PROGRAM". The content of which are incorporated by reference herein in their entirety.

FIELD

The present disclosure relates to a roadside device, a method of controlling the roadside device, and a non-transitory storage medium.

BACKGROUND

A technique of photographing around the intersection from above, in an overlooking manner, by a camera of a roadside device is known. In this technique, a satellite navigation device calculates the traveling position of a vehicle and the walking position of a pedestrian based on a captured image received from the roadside device and symbols indicating the vehicle and the pedestrian are displayed superimposed on a map image.

SUMMARY

A roadside device according to one aspect includes a detector configured to detect information for determining a state of a sidewalk around the roadside device, a communication unit configured to communicate with an other device, and at least one processor. The roadside device is configured to determine the state of the sidewalk around the roadside device based on the information, and transmit the determined state of the sidewalk to the other device.

A method of controlling a roadside device according to one aspect includes the steps of detecting information for determining a state of a sidewalk around the roadside device, determining the state of a sidewalk around the roadside device based on the detected information, and transmitting the determined state of the sidewalk to an other device.

A computer-readable non-transitory storage medium storing a control program for controlling a roadside device to execute the steps of detecting information for determining a state of a sidewalk around the roadside device, determining the state of a sidewalk around the roadside device based on the detected information, and transmitting the determined state of the sidewalk to an other device.

DETAILED DESCRIPTION

Embodiments for executing the present disclosure will be described in detail with reference to the drawings. Hereinafter, a description is made on a smartphone as an example of an electronic device.

First Embodiment

Figure 1:
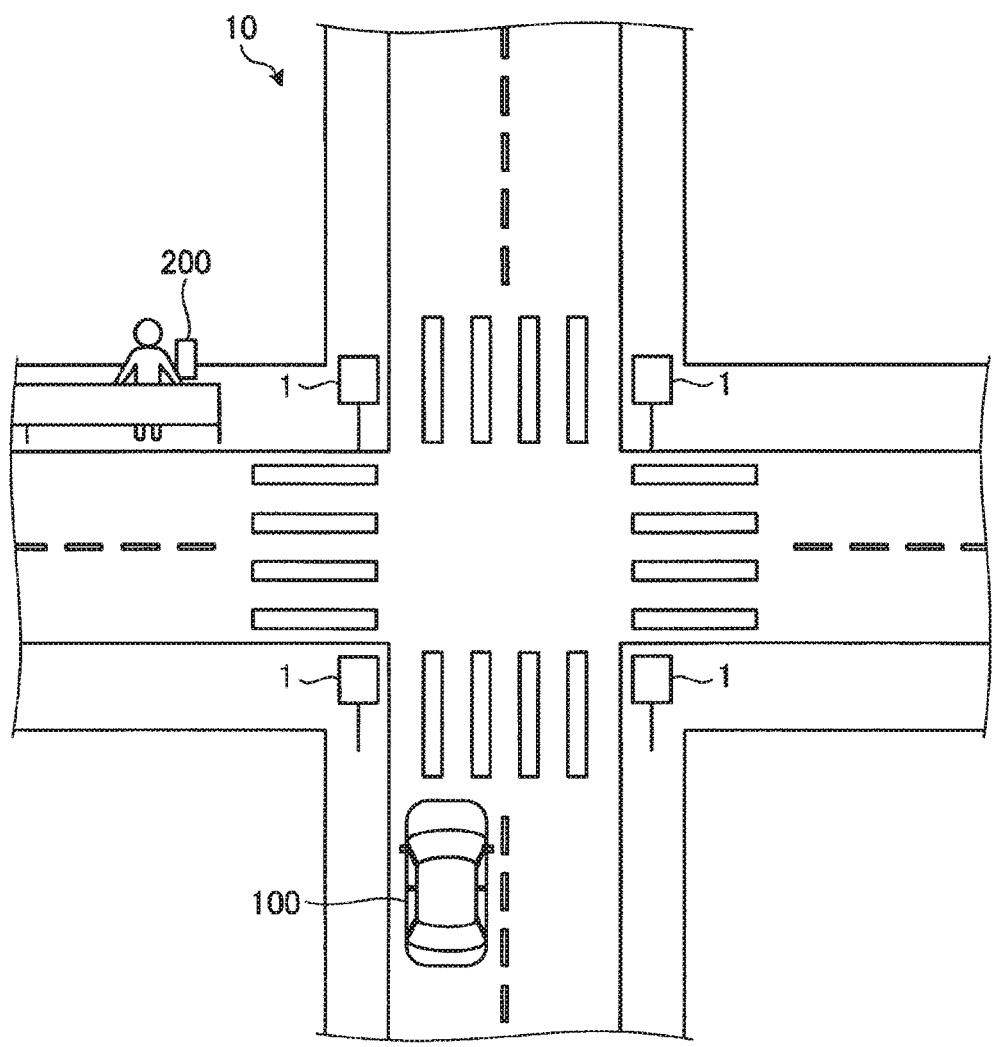
FIG. 1 illustrates a schematic diagram showing a schematic configuration of a control system including roadside devices according to a first embodiment.

Referring to FIG. 1, the overall configuration of a control system 10 including the roadside device 1 will be described.

Two roads intersect each other at an intersection in FIG. 1. A sidewalk is provided in parallel with a road. In the first embodiment, the sidewalk includes a sidewalk for pedestrian and a pedestrian and bicycle road for pedestrian and cyclists. The roadside device 1 is located by the road in the vicinity of the intersection.

The control system 10 includes the roadside device 1, the in-vehicle device (other device) 110 (see FIG. 2), and the smartphone (other device) 200. Four roadside devices 1, one vehicle 100, and one smartphone 200 are illustrated in FIG. 1, however, the numbers of each device are not limited to above; one or more roadside devices 1, one or more vehicles 100, and one or more smartphone 200 are required for the control system 10.

The vehicle 100 acquires information on the roadside device 1 by communicating with the roadside device 1 via the communication unit 111 of the in-vehicle device 110. The vehicle 100 acquires information on the smartphone 200 by communicating with the smartphone 200 via the communication unit 111 of the in-vehicle device 110.

Figure 2:
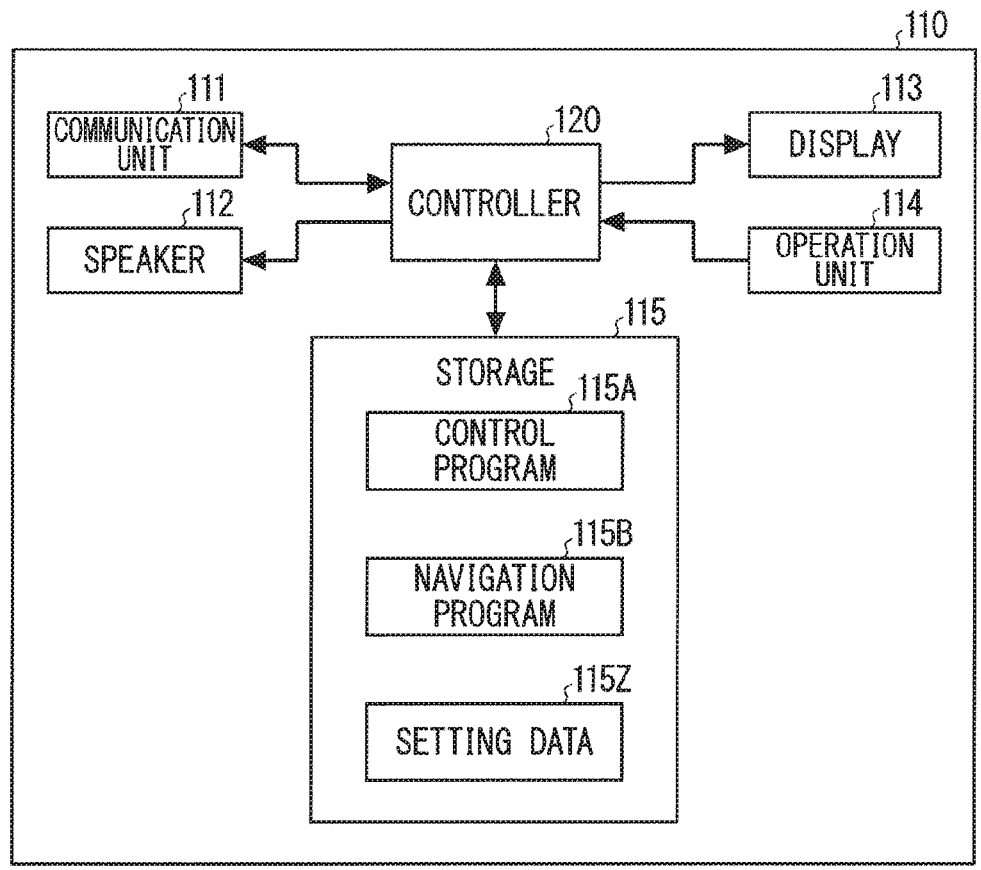
FIG. 2 illustrates a block diagram of an in-vehicle device.

Referring to FIG. 2, the overall configuration of the in-vehicle device 110 will be described. The in-vehicle device 110 mounted on the vehicle 100 is an electronic device having a communication function. The in-vehicle device 110 includes, for example, a navigation device, an audio device, and the like assembled into the vehicle 100. The in-vehicle device 110 may be a portable electronic device carried by an occupant. The in-vehicle device 110 outputs information acquired from the roadside device 1 or the smartphone 200 in the form of images, characters or the like through a display 113 or in the form of sound through a speaker.

The in-vehicle device 110 includes the communication unit 111 that communicates with the roadside device 1, a speaker 112, a display 113, an operation unit 114, a storage 115, and a controller 120.

The communication unit 111 can wirelessly communicate. The communication unit 111 supports wireless communication standards such as Worldwide Interoperability for Microwave Access (WiMAX), IEEE802.11 (including a,b,n,p), Bluetooth (registered trademark), Infrared Data Association (IrDA), and Near Field Communication (NFC). Also, the communication unit 11 may support the cellular phone communication standards include such as 2G (generation), 3G (generation), 4G (generation) and so forth including Long Term Evolution (LTE), Wideband Code Division Multiple Access (W-CDMA), CDMA 2000, Personal Digital Cellular (PDC), Global System for Mobile Communications (GSM) (registered trademark), Personal Handy-phone System (PHS), and the like. The communication unit 111 supports one or more of the communication standards described above. The communication unit 111 may support wired communication standards such as Ethernet (registered trademark) and Fiber Channel.

The communication unit 111 can communicate with the roadside device 1. The communication unit 111 communicates with a communication device presenting within a predetermined distance, for example, the roadside device 1, via the short-range wireless communication, and transmits and receives data. In the first embodiment, the communication unit 111 communicates with the roadside device 1 to transmit and receive data including a state of a pedestrian.

The communication unit 111 may communicate with the smartphone 200. In this case, the communication unit 111 communicates with the smartphone 1 presenting within the predetermined distance via the short-range wireless communication, and transmits and receives data including information of subject vehicle and information of pedestrian.

The speaker 112 represents an audio output unit.

The display 113 includes a display device such as a Liquid Crystal Display (LCD), an Organic Electro-Luminescence Display (OELD), or an Inorganic Electro-Luminescence Display (IELD). The display 113 displays objects such as characters, images, symbols, graphics, and so forth.

Through the operation unit 114, an operation for the in-vehicle device 100 can be input. The operation unit 114 is operated by a user. If an operation is detected, the operation unit 114 outputs a corresponding signal to the controller 120.

The storage 115 can store programs and data therein. The storage 115 is also used as a work area for temporarily storing processing results of the controller 120. The storage 115 may include any non-transitory storage medium such as a semiconductor storage medium and a magnetic storage medium. The non-transitory storage medium includes, but not limited to, optical disks such as CD (registered trademark), DVD (registered trademark), and Blu-ray (registered trademark), a magneto optical disk, a magnetic storage medium, a memory card, and a solid-state storage medium. The storage 115 may include multiple types of storage medium. The storage 115 may include a combination of a portable storage medium such as a memory card, an optical disk, or a magneto-optical disk and a reading device of the storage medium. The storage 115 may include a storage device used as a temporary storage area such as a Random Access Memory (RAM).

The program stored in the storage 115 includes a program in which establishment of the communication with a communication device presenting within the predetermined distance and control of data transmission and reception are executed.

Part or all of the programs and data stored in the storage 115 may be downloaded from another device by communication by the communication unit 111. Part or all of the programs and data stored in the storage 115 may be stored in a non-transitory storage medium readable by a reading device included in the storage 115. Part or all of the programs and data stored in the storage 115 may be stored in a non-transitory storage medium readable by a reading device connected to the connector (not shown).

The storage 115 stores, for example, a control program 115A, a navigation program 115B, and the setting data 115Z.

The controller 120 can perform various functions by executing the program stored in the storage 115. The navigation program 115B provides a function of searching for a route from the departure point to the destination and guiding the route. The controller 120 that executes the navigation program 115B causes the display 113 to display the information on the route and surroundings. The information on surroundings includes information on at least any of a state of a sidewalk and a danger level of a sidewalk and a pedestrian.

The setting data 115Z includes various setting information related to the operation of the in-vehicle device 110.

The control program 115A provides functions related to various control for operating the in-vehicle device 110.

The controller 120 is an arithmetic processing unit, for example. The arithmetic processing unit may include, but not limited to, a Central Processing Unit (CPU), a System-on-a-Chip (SoC), a Micro Control Unit (MCU), and a Field-Programmable Gate Array (FPGA), and a processor. The controller 120 comprehensively controls the operation of the roadside device 1 to realize various functions.

The controller 100 can also be said to be a control circuit. The controller 10 includes at least one processor for providing control and processing capability to perform various functions as described in further detail below.

In accordance with various embodiments, the at least one processor may be implemented as a single integrated circuit (IC) or as multiple communicatively coupled ICs and/or discrete circuits. It is appreciated that the at least one processor can be implemented in accordance with various know technologies.

In one embodiment, the processor includes one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may include one or more processors, controllers, microprocessors, microcontrollers, application specific integrated circuits (ASICs), digital signal processors, programmable logic devices, field programmable gate arrays, or any combination of the devices or structures, or other known devices and structures, to perform the functions described herein.

The above description on the controller 10 is also applied to a controllers 5 and 210 below.

Figure 3:
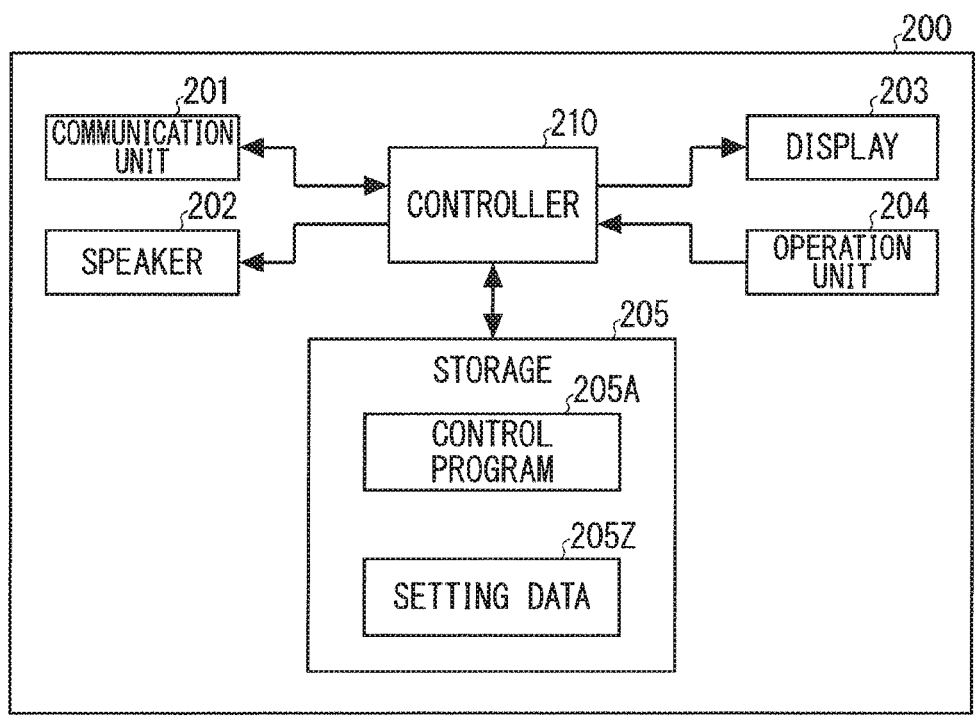
FIG. 3 illustrates a block diagram of a smartphone.

Referring to FIG. 3, the overall configuration of the smartphone 200 will be described.

The smartphone 200 acquires information on the roadside device 1 by communicating with the roadside device 1 via the communication unit. The smartphone 200 acquires information on the vehicle 100 by communicating with the vehicle 100 via the communication unit. For example, the smartphone 200 outputs information acquired from the roadside device 1 or the vehicle 100 in the form of images, characters or the like through a display 203 or in the form of sound through a speaker 202.

The smartphone 200 includes a communication unit 201 that communicates with the roadside device 1, a speaker 202, a display 203, an operation unit 204, a storage 205, and a controller 210.

The communication unit 201 can wirelessly communicate. The communication unit 201 may support wireless communication standards including WiMAX, IEEE 802.11

(including a,b,n,ac,p), Bluetooth (registered trademark), IrDA, NFC, and the like, for example. Also, the communication unit 201 may support the cellular phone communication standards include such as 2G, 3G, 4G and so forth including LTE, W-CDMA, CDMA 2000, PDC, GSM (registered trademark), PHS and the like. The communication unit 201 supports one or more of the communication standards described above. The communication unit 201 may support wired communication standards such as Ethernet (registered trademark) and Fiber Channel.

The communication unit 201 can communicate with the roadside device 1. The communication unit 201 communicates with a communication device presenting within a predetermined distance, for example, the roadside device 1, via the short-range wireless communication, and transmits and receives data. In the first embodiment, the communication unit 201 communicates with the roadside device 1 to transmit and receive data including a state of a subject-device.

The communication unit 201 may communicate with the in-vehicle 110. In this case, the communication unit 201 communicates with the in-vehicle 110 presenting within the predetermined distance via the short-range wireless communication, and transmits and receives data including information of pedestrian and information of vehicle.

The speaker 202 represents an audio output unit.

The display 203 is a display device including a liquid crystal display, an organic electro-luminescence display, an inorganic electro-luminescence display and the like. The display 203 displays objects such as characters, images, symbols, graphics, and so forth. The display 203 may include a display and a touch screen.

The display includes a display device such as a liquid crystal display, an organic electro-luminescence display, an inorganic electro-luminescence display and the like. The display displays objects such as characters, images, symbols, graphics, and so forth.

The touch screen detects contact or approach of an operator, such as a finger, a pen, a stylus pen, or the like, on the touch screen. The touch screen can detect a position where an operator, such as a plurality of fingers, a pen, a stylus pen, or the like touches the touch screen. The detection method of the touch screen may include an arbitrary method such as an electrostatic capacitance method, a resistive film method, a surface acoustic wave method (or an ultrasonic method), an infrared method, an electromagnetic induction method, and a load detection method. In the following description, for simplicity of explanation, it is assumed that a user touches the touch screen using a finger in order to operate the smartphone 200.

The smartphone 200 determines operation (gesture) to be performed on the touch screen based on at least one of contact detected by the touch screen, a position where contact is detected, a change in a position where contact is detected, a detected contact interval, and a number of detected contact times is detected. Operations performed on the touch screen include, but not limited to, touch, long touch, release, swipe, tap, double tap, long tap, drag, flick, pinch in, and pinch out.

Through the operation unit 204, an operation for the subject-device can be input. The operation unit 204 is operated by a user. If an operation is detected, the operation unit 204 outputs a corresponding signal to the controller 210. The touch panel can be considered as a type of the operation unit 201.

The storage 205 can store programs and data therein. The storage 205 is also used as a work area for temporarily storing processing results of the controller 210. The storage 205 may include any non-transitory storage medium such as a semiconductor storage medium and a magnetic storage medium. The non-transitory storage medium includes, but not limited to, optical disks such as CD (registered trademark), DVD (registered trademark), and Blu-ray (registered trademark), a magneto optical disk, a magnetic storage medium, a memory card, and a solid-state storage medium. The storage 205 may include multiple types of storage medium. The storage 205 may include a combination of a portable storage medium such as a memory card, an optical disk, or a magneto-optical disk and a reading device of the storage medium. The storage 205 may include a storage device used as a temporary storage area such as a RAM.

The program stored in the storage 205 includes a program in which establishment of the communication with a communication device presenting within the predetermined distance and control of data transmission and reception are executed.

Part or all of the programs and data stored in the storage 205 may be downloaded from another device by communication by the communication unit 201. Part or all of the programs and data stored in the storage 205 may be stored in a non-transitory storage medium readable by a reading device included in the storage 205. Part or all of the programs and data stored in the storage 205 may be stored in a non-transitory storage medium readable by a reading device connected to the connector (not shown).

The storage 205 stores, for example, a control program 205A, and setting data 205Z.

The setting data 205Z includes information on various settings related to the operation of the smartphone 200.

The control program 205A provides functions related to various controls for operating the smartphone 200.

The controller 210 is an arithmetic processing unit, for example. The arithmetic processing unit includes, but not limited to, CPU, SoC, MCU, and FPGA, for example. The controller 210 comprehensively controls the operation of the smartphone 200 to realize various functions.

Figure 4:
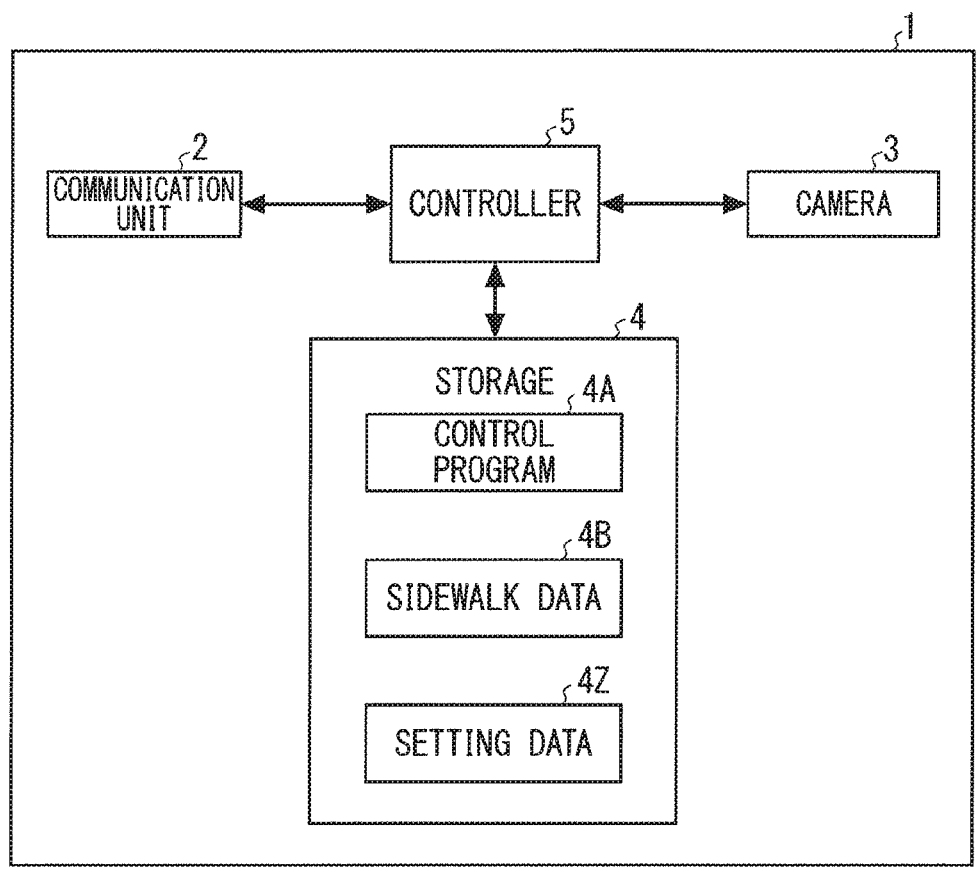
FIG. 4 illustrates a block diagram showing the roadside device according to the first embodiment.

Referring to FIG. 4, the overall configuration of the roadside device 1 will be described. The roadside device 1 can wirelessly output identification information of a subject-device. The identification information is information for identifying the respective roadside devices 1 and is represented by, for example, an identification number. The roadside device 1 may wirelessly output, for example, signal information and road information including congestion information and road regulation information (speed regulation, etc.), together with the identification information of the subject-device and the determined state of the sidewalk (described later).

The roadside device 1 includes a communication unit 2 that communicates with at least one of the in-vehicle device 110 and the smartphone 200, a camera (detector) 3 that detects information for determining the state of the sidewalk, a storage 4, and a controller 5.

The communication unit 2 can wirelessly communicate. The communication unit 2 may support wireless communication standards including WiMAX, IEEE 802.11 (including a,b,n,p), Bluetooth (registered trademark), IrDA, NFC, and the like, for example. Also, the communication unit 2 may support the cellular phone communication standards include such as 2G, 3G, 4G and so forth including LTE. W-CDMA, CDMA 2000, PDC, GSM (registered trademark), PHS and the like. The communication unit 2 supports one or more of the communication standards described above. The communication unit 2 may support wired communication standards such as Ethernet (registered trademark) and Fiber Channel.

The communication unit 2 can communicate with other roadside device 1 and a traffic light. The communication unit 2 communicates with a communication device presenting within a predetermined distance, for example, at least one of the in-vehicle device 110 and the smartphone 200, via the short-range wireless communication, and transmits and receives data including the identification information of the subject-device, the state of the sidewalk, and the road information.

The camera 3 can detect information for determining the state of the sidewalk. Specifically, the camera constantly photographs images overlooking surroundings of the road on which the roadside device 1 is installed as the information, for example. The camera 3 photographs images of surroundings of the roadside device 1 including the sidewalk. For example, the camera 3 photographs an area scale corresponding to that of the communication area. More specifically, the camera 3 photographs an area of several tens to several hundred meters, for example. The camera 3 stores the photographed images into the storage 4.

The storage 4 can store programs and data therein. The storage 4 is also used as a work area for temporarily storing processing results of the controller 5. The storage 4 may include any non-transitory storage medium such as a semiconductor storage medium and a magnetic storage medium. The non-transitory storage medium includes, but not limited to, optical disks such as CD (registered trademark), DVD (registered trademark), and Blu-ray (registered trademark), a magneto optical disk, a magnetic storage medium, a memory card, and a solid-state storage medium. The storage 4 may include multiple types of storage medium. The storage 4 may include a combination of a portable storage medium such as a memory card, an optical disk, or a magneto-optical disk and a reading device of the storage medium. The storage 4 may include a storage device used as a temporary storage area such as a RAM.

The program stored in the storage 4 includes a program in which establishment of the communication with a communication device presenting within the predetermined distance and control of data transmission and reception are executed. The data to be stored into the storage 4 includes data or the like to be transmitted to the other communication device, including the identification information of the subject-device or the like.

Part or all of the programs and data stored in the storage 4 may be downloaded from another device by communication by the communication unit 201. Part or all of the programs and data stored in the storage 4 may be stored in a non-transitory storage medium readable by a reading device included in the storage 4. Part or all of the programs and data stored in the storage 4 may be stored in a non-transitory storage medium readable by a reading device connected to the connector (not shown).

The storage 4 stores, for example, a control program 4A, sidewalk data 4B, and setting data 4Z.

The sidewalk data 4B includes a state in the vicinity of a sidewalk or a state of the sidewalk in the vicinity where the roadside device 1 is installed (hereinafter referred to as "state of sidewalk"). The sidewalk data 4B includes a state of sidewalk in an area scale corresponding to that of the communication area of the roadside device 1. The state of sidewalk represents information having an influence on the safety of the sidewalk, for example.

The state of sidewalk includes information for determining a danger level of the sidewalk. Examples of the state of sidewalk are as follows: presence or absence, type, and installation state (position, height, width, etc.) of a guardrail; presence or absence, type, height, and installation state (position, etc.) of a curb; presence or absence, type, and installation state (position, width, depth, etc.) of a lateral groove; presence or absence of a sidewalk and a state of sidewalk width; presence or absence of a crosswalk; presence or absence of a traffic light including traffic lights for vehicle and for pedestrian and a lighting state thereof; presence or absence of a pedestrian overpass and height thereof; presence or absence of a construction site and dedicated area thereof and a state of ensuing change of sidewalk or roadway; presence or absence of an accident and dedicated area thereof and a state of ensuing change of sidewalk or roadway; presence or absence of a stopping or parking vehicle, an obstacle, a dedicated area thereof, and a state of ensuing change of sidewalk or roadway; presence or absence of pedestrian and cyclist, the number thereof and information on whether a child and an elderly person are included among pedestrians; a state of unexpected appearance of pedestrian and cyclist; and the like.

The setting data 4Z includes various setting information related to the operation of the roadside device 1.

The control program 4A provides functions related to various control for operating the roadside device 1. The controller 5 executes the following operations by executing the control program 4A, for example.

Based on the image captured by the camera 3, the controller 5 determines the state of sidewalk in the vicinity of the subject-device, and transmits the determined state of sidewalk to at least one of the in-vehicle device 110 and the smartphone 200 via the communication unit 2.

In the first embodiment, based on the determined state of sidewalk, the controller 5 may determine the danger level of the sidewalk. And, if a pedestrian is determined to be present on a sidewalk in which the determined danger level satisfies a predetermined condition, the controller 5 may transfer information on at least any of a state of sidewalk and a danger level of the sidewalk and a pedestrian to at least one of the in-vehicle device 110 and the smartphone 20X) via the communication unit 2. As the predetermined condition, such a condition that the danger level is greater than a standard value can be adopted, for example. The standard value is preset, for example, and may be stored in the storage 4.

Also, the controller 5 may transfer the determined danger level of the sidewalk to at least one of the in-vehicle 110 and the smartphone 200.

Also, if the determined danger level of the sidewalk is determined to satisfy the predetermined condition, the controller 5 may transfer at least one of the state of sidewalk and the danger level of the sidewalk to at least one of the in-vehicle 110 and the smartphone 200.

The controller 5 may transfer information on at least any of the state of sidewalk and the danger level of the sidewalk and a pedestrian, the information to be transferred may and may not be processed.

The controller 5 is an arithmetic processing unit, for example. The arithmetic processing unit includes, but not limited to, CPU, SoC, MCU, and FPGA, for example. The controller 5 comprehensively controls the operation of the roadside device 1 to realize various functions.

Specifically, the controller 5 executes an instruction included in the program stored in the storage 4 while referring to the data stored in the storage 4 as necessary. And, the controller 5 controls the functional unit in accordance with the data and the instruction, thereby realizing various functions.

Next, with reference to FIG. 5 a control method of the roadside device 1 and the control program 4A and the action thereof will be described.

Figure 5:
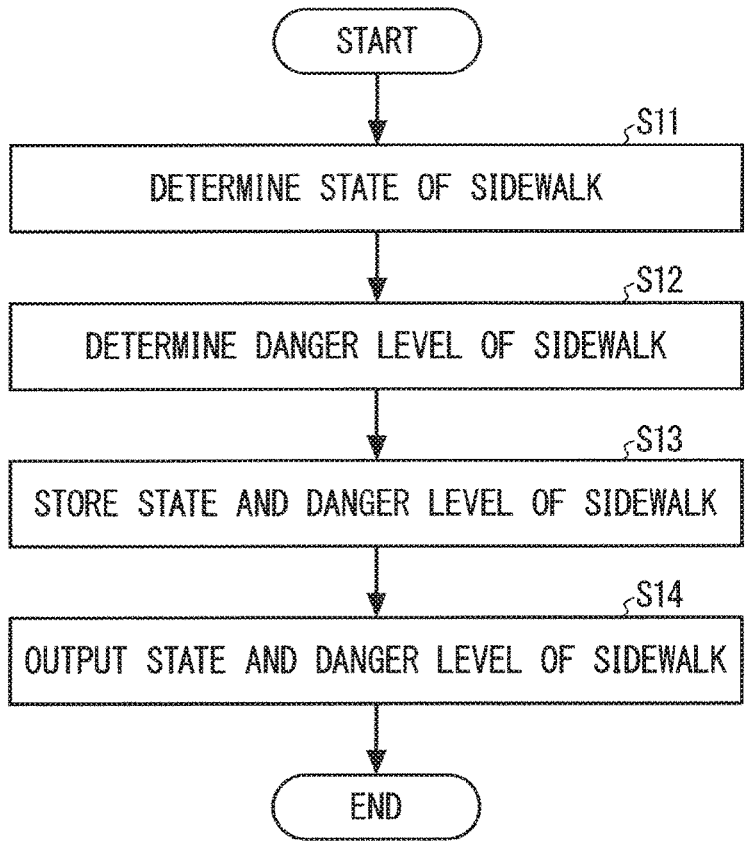
FIG. 5 illustrates a flowchart showing an example of control performed by the roadside device according to the first embodiment.

The roadside device 1 can realize a function illustrated in FIG. 5 by executing the control program 4A stored in the storage 4 by the controller 5. Also, the controller 5 may execute a processing procedure for other function in parallel with the processing procedure illustrated in FIG. 5.

The controller 5 determines the state of sidewalk (step S11). More specifically, based on the image photographed by the camera 3, the controller 5 extracts a sidewalk that is one of the photographing objects by, for example, extracting at least any of the characteristic contour, color, and luminance of the sidewalk. The method of extracting the photographing objects based on the image is carried out by any known method. Then, based on the image, the controller 5 can extract at least any of the characteristic contour, color, and luminance of the photographing objects, for example, and identify the photographing objects based on the extracted information. Although an arbitrary method may be adopted as this identification method, for example, the controller 5 performs image processing on image data photographed by the camera 3 and extracts a feature amount (for example, HOG feature amount or the like) and identifies the photographing objects based on the feature amount. Machine learning such as Support Vector Machine (SVM), for example, may be used for this identification.

Examples of the photographing objects indicating the state of sidewalk are those position in the sidewalk or in the vicinity of the sidewalk including a guardrail, a curb, a lateral groove, a sidewalk width, a crosswalk, a traffic light, a pedestrian overpass, a construction site, an accident site, a stopping or parking vehicle and an obstacle, and pedestrians and cyclists. The controller 5 can determine the state of the sidewalk based on these elements.

The controller 5 identifies the photographing objects based on the image data, as a result, an area occupied by the photographing objects in the image can be specified. The controller 5 may be able to specify the actual position of the photographing objects based on the positions of the photographing objects in the image. For example, if the camera 3 images an area directly under the camera 3 along the vertical direction, the image data captured by the camera 3 indicates a so-called bird's-eye view image. The correspondence relation between each position in the bird's-eye image and each position in reality may be determined in advance and stored in the storage 4. The controller 5 may be able to specify the actual position of the photographing objects based on the positions of the photographing objects in the bird's-eye image and the correspondence relation stored in the storage 4. In a case where the camera 3 is disposed obliquely with respect to the ground, for example, the controller 5 may generate a bird's-eye image by performing coordinate conversion on the image data.

For example, based on the image, the controller 5 extracts at least any of the characteristic contour, the color, and the luminance of the guardrail; thereby the controller 5 determines the presence or absence, type, and installation state of the guardrail. In the first embodiment, the guardrail indicates a protective fence installed at the boundary between a roadway and a sidewalk. The installation state of guardrail includes information on the position the guardrail is installed. The position information may be the latitude and longitude, for example. The installation state of guardrail includes information on, for example, information on a position where an abnormality has occurred in the guardrail, such as a deformed part or a gap in the guardrail. A portion where such an abnormality has occurred is identified by the controller 5 by the above-described identification method, for example. Therefore, presence or absence, type, and installation state of the guardrail, in the predetermined position on the sidewalk, are determined.

For example, based on the image, the controller 5 extracts at least any of the characteristic contour, the color, and the luminance of the curb; thereby the controller 5 determines the presence or absence, type, and installation state of the curb. In the first embodiment, the curb indicates a curb installed at the boundary between a roadway and a sidewalk. The installation state of a curb includes information on the position the curb is installed. The installation state of curb includes information on, for example, information on a position where an abnormality has occurred in the curb such as a gap in the curb. Therefore, presence or absence, type, and installation state of the curb, in the predetermined position on the sidewalk, are determined.

For example, based on the image, the controller 5 extracts at least any of the characteristic contour, the color, and the luminance of the lateral groove; thereby the controller 5 determines presence or absence, type, and installation state of the lateral groove. In the first embodiment, the lateral groove indicates a lateral groove installed at the boundary between a roadway and a sidewalk or at a sidewalk. The installation state of a lateral groove includes information on the position the lateral groove is installed. The installation state of lateral groove includes information on, for example, information on a position where an abnormality has occurred in the lateral groove such as presence or absence of a cover for the lateral groove or a gap in the cover for the lateral groove. Therefore, presence or absence, type, and installation state of the lateral groove, in the predetermined position on the sidewalk, are determined.

For example, based on the image, the controller 5 extracts at least any of the characteristic contour, the color, and the luminance of the sidewalk; thereby the controller 5 determines the sidewalk width and state of the sidewalk width. The controller 5 can obtain the sidewalk width based on the image photographed by the camera 3. For example, the correspondence relation between the size of one pixel in the bird's-eye image and the actual size of the area photographed in the one pixel is preset and stored in the storage 4. For example, the controller 5 may calculate the width (sidewalk width) of the actual sidewalk, based on the width of the sidewalk (the width in the pixel unit) in the bird's-eye image captured by the camera 3 (or the bird's-eye image obtained by performing the coordinate conversion on the image data captured by the camera 3) and the above correspondence relation stored in the storage 4.

The state of sidewalk width includes information on a position where the sidewalk width is wide and a position where the sidewalk width is narrow. If the width of the sidewalk is equal to or larger than a width reference value, the controller 5 determines that the width of the sidewalk is wide. The controller 5 may set the width reference value for determining whether the sidewalk width is wide or narrow to be larger as the traffic volume of the sidewalk increases. For example, regarding a pedestrian and bicycle road, the controller 5 may determine that the sidewalk width is wide, if the sidewalk width is equal to or greater than a first value (e.g. 5 m) for a sidewalk where the traffic volume of a pedestrian is equal to or greater than a predetermined value, and may determine that the sidewalk width is wide, if the sidewalk width is equal to or greater than a second value (>the first value, e.g. 4 m) for the other sidewalks. The traffic volume on the sidewalk can be determined, for example, by the controller 5 identifying a pedestrian located on the sidewalk from the image photographed by the camera 3 and counting the number of pedestrians located on the sidewalk.

Further, the controller 5 may set the width reference value in accordance with the type of sidewalk. Specifically, the width reference value for sidewalks other than a pedestrian and bicycle road may be set smaller than the width reference value for the pedestrian and bicycle road. This is because the pedestrian and bicycle road on which the bicycle travels tends to be formed relatively widely, whereas the sidewalks other than the pedestrian and bicycle road tend to be formed narrower than the pedestrian and automobile road.

Also, the controller 5 may set the width reference value for the sidewalks other than the pedestrian and bicycle road, in accordance with the traffic volume of the sidewalks. For example, regarding the sidewalk other than the pedestrian and bicycle road, it is determined that the sidewalk is wide, if the sidewalk is equal to or greater than a third value (<the first value, e.g. 4 m) for a sidewalk where the traffic volume of pedestrian is equal to or greater than a predetermined value, and it is determined that the sidewalk is wide, if the sidewalk is equal to or greater than a fourth value (<the third value, e.g. 3 m) for the other sidewalks. Therefore, the sidewalk width and the state of sidewalk width, in the predetermined position on the sidewalk, are determined. Further, the numerical values exemplified here may be appropriately changed.

For example, based on the image, the controller 5 extracts at least any of the characteristic contour, the color, and the luminance of the crosswalk, thereby the controller 5 determines presence or absence of the crosswalk. The controller 5 determines whether a crosswalk is connected to a sidewalk and the connection position. The connection position of the crosswalk includes information on position at which the crosswalk is provided. Therefore, presence or absence of a crosswalk, in the predetermined position on the sidewalk, is determined.

For example, based on the image, the controller 5 extracts at least any of the characteristic contour, the color, and the luminance of the traffic light; thereby the controller 5 determines presence or absence of the traffic light and the lighting state thereof. Therefore, presence or absence of the traffic light and the lighting state thereof, in the predetermined position on the sidewalk, are determined.

For example, based on the image, the controller 5 extracts at least any of the characteristic contour, the color, and the luminance of the pedestrian overpass; thereby the controller 5 determines presence or absence, height, and the installation state of the pedestrian overpass. The installation state of a pedestrian overpass includes information on the position the pedestrian overpass is installed. Therefore, presence or absence, height, and the installation state of the pedestrian overpass, in the predetermined position on the sidewalk, are determined.

For example, based on the image, the controller 5 extracts at least any of the characteristic contour, the color, and the luminance of the construction site; thereby the controller 5 determines presence or absence of a construction site, an dedicated area thereof, and a state of ensuing change of sidewalk or roadway. In the first embodiment, the construction indicates a construction that occupies at least one portion of a sidewalk or road. The dedicated area includes information on position where a construction is implemented. The state of change of sidewalk or roadway indicates a state where a portion of the sidewalk or roadway is occupied by the construction and it has been changed from the normal time. For example, the state of change of sidewalk includes a state where the sidewalk has been narrower than that is in the normal time and the sidewalk has been changed such that the path is protruding out to a roadway side due to the construction.

For example, the controller 5 identifies a sidewalk and a roadway from the image in which the construction is not being implemented, and stores the positions and shapes thereof in the storage 4. Then, when the controller 5 identifies the construction site based on the image captured by the camera 3 and specifies the dedicated area thereof, the controller 5 determines, based on the position of the dedicated area for the sidewalk and the roadway, whether the sidewalk is narrowed or whether the sidewalk has been changed such that the path is protruded out to the roadway side. For example, when a dedicated area is located substantially the entire area of the sidewalk in the width direction, the sidewalk is separated by the dedicated area. Therefore, in this case, it can be determined that a part of the roadway is used as a road connecting the separated sidewalks temporarily. In this case, the controller 5 can determine that the sidewalk has been changed such that the path is protruding out to the roadway side. Meanwhile, if the dedicated area is located only in a part of the sidewalk in the width direction, the control unit 5 can determine that the sidewalk has been narrowed.

Further, for example, the state of change of roadway includes a state where the lane is regulated and changed due to the construction. For example, if the dedicated area is located over substantially the entire area of one lane of the road (roadway) in the width direction, the controller 5 can determine that the one lane is restricted and the passage is prohibited. Therefore, presence or absence of a construction site, a dedicated area thereof, and a state of change of a sidewalk or a roadway adjacent to the sidewalk, in the predetermined position on the sidewalk, are determined.

For example, based on the image, the controller 5 extracts at least any of the characteristic contour, the color, and the luminance of the accident site; thereby the controller 5 determines presence or absence of an accident site, a dedicated area thereof, and a state of ensuing change of sidewalk or roadway. In the first embodiment, the accident indicates an accident that occupies at least one portion of a sidewalk or road. The dedicated area includes information on position where an accident has occurred. The state of change of sidewalk or roadway indicates a state where a portion of the sidewalk or roadway is occupied by the accident and it has been changed from the normal time. For example, the state of change of sidewalk includes a state where the sidewalk has been narrower than that is in the normal time and the sidewalk has been changed such that the path is protruding out to the roadway side due to the accident. For example, the state of change of roadway includes a state where the lane is regulated and changed due to the accident. Therefore, presence or absence of an accident site, a dedicated area thereof, and a state of change of a sidewalk or a roadway adjacent to the sidewalk, in the predetermined position on the sidewalk, are determined. A specific example of these determinations is the same as that of the construction site, therefore, repeated explanations are avoided.

For example, based on the image, the controller 5 extracts at least any of the characteristic contour, the color, and the luminance of a stopping or parking vehicle or an obstacle; thereby the controller 5 determines presence or absence of stopping or parking vehicle or an obstacle, a dedicated area thereof, the state of change of sidewalk or roadway. In the first embodiment, the stopping or parking vehicle or the obstacle occupies at least one portion of a sidewalk or road.

In the first embodiment, the obstacle includes an object that hinders walking of the pedestrian or traveling of the vehicle 100, a water puddle, and the like. The dedicated area includes information on the position of a stopping or parking vehicle or an obstacle. The state of change of sidewalk or roadway indicates a state where a portion of the sidewalk or roadway is occupied by the stopping or parking vehicle or the obstacle and it has been changed from the normal time. For example, the state of change of sidewalk includes a state where the sidewalk has been narrower than that is in the normal time and the sidewalk has been changed such that the path is protruding out to the roadway side due to stopping or parking of the vehicle or the obstacle. For example, the state of change of roadway includes a state where the lane is regulated and changed due to stopping or parking of the vehicle or the obstacle. Therefore, the roadside device 1 can determine the presence or absence of a stopping or parking vehicle or an obstacle, a dedicated area thereof, and a state of change of a sidewalk or a roadway adjacent to the sidewalk, in the predetermined position on the sidewalk, are determined. A specific example of these determinations is the same as that of the construction site, therefore, repeated explanations are avoided.

For example, the controller 5 extracts at least any of the characteristic contour, the color, and the luminance of a pedestrian or a cyclist; thereby the controller 5 determines presence or absence of a pedestrian or a cyclist, the number thereof, the position thereof, whether a child or an elderly person is included among pedestrians, and a state of unexpected appearance of pedestrian or cyclist. Determination of whether a child or an elderly person is included among pedestrians can be performed by the above-described identification method, for example. For example, the controller 5 may identify a child and an elderly person based on the image data.

In the first embodiment, a pedestrian indicates a person who is walking or running on a sidewalk or a roadway. In the first embodiment, a cyclist indicates a person who is riding on a sidewalk or a roadway. A state of unexpected appearance and the like includes a state of dangerous action such as abrupt entry of a pedestrian or a cyclist to the roadway side. For example, the controller 5 may detect abrupt entry of a pedestrian or a bicycle in the following manner. For example, the controller 5 calculates the moving direction of the pedestrian or the cyclist from the image data sequentially captured by the camera 3. Specifically, for example, the controller 5 calculates the moving direction based on a change in the position of a pedestrian (for example, a motion vector) between image data. For example, if the distance between the position of the pedestrian or the cyclist and the roadway is shorter than a predetermined value and the moving direction of the pedestrian or the cyclist is a direction toward the roadway, the controller 5 may determine that the pedestrian or the cyclist has entered into the roadway.

Therefore, presence or absence of a pedestrian or a cyclist, the number thereof, the position thereof, whether a child or an elderly person is included among pedestrians, and a state of unexpected appearance of pedestrian or cyclist, in the predetermined position on the sidewalk, are determined.

The controller 5 determines the danger level of the sidewalk (step S12). The controller 5 determines the danger level of the sidewalk based on the determined state of the sidewalk. The danger level is determined to be high if the vehicle 100 requires attention to a pedestrian or cyclist on the sidewalk and is determined to be low if the vehicle 100 does not require attention to the pedestrian or cyclist on the sidewalk. For example, the controller 5 determines the danger level of the sidewalk based on each item on a guardrail, a curb, a lateral groove, a sidewalk width, a crosswalk, a traffic light, a pedestrian overpass, a construction, an accident, a stopping or parking vehicle and an obstacle, and a pedestrian and a cyclist.

The controller 5 may determine that the danger level at a predetermined position of the sidewalk, in which it is determined that at least one of the items has a high danger level, is high.

The controller 5 may determine that the danger level of a predetermined position of the sidewalk is higher as the number of items determined to have a high danger level increases.

The controller 5 may weight each item and determine the danger level. For example, the controller 5 may weight the position without the guardrail and the position where the sidewalk or the roadway has been changed more heavily than the other positions, and determine that the danger level at the predetermined position of the sidewalk is higher.

The controller 5 may determine whether the danger level is high based on a combination of items. In this case, combinations of items determined to have high danger levels are stored in the storage 4 in advance. For example, it is stored in the storage 4 that the danger level of the predetermined position of the sidewalk is high when the combination of items indicates that sidewalk width is narrow, a guardrail is absent, and a curb is absent. For example, it is stored in the storage 4 that the danger level of the predetermined position of the sidewalk is low when the combination of items indicates that a sidewalk width is wide, a guardrail is present. For example, it is stored in the storage 4 that the danger level of the predetermined position of the sidewalk is low the combination of items indicates that a sidewalk width is wide, a curb is present.

The determination of the danger level of each item will be described.

For example, the controller 5 determines the danger level of the sidewalk based on the presence or absence, the type, and the installation state of the guardrail. A sidewalk with a guardrail is separated from a roadway by the guardrail. In a sidewalk with a guardrail, it is considered improbable that a pedestrian would climb over the guardrail and go into the roadway. In a sidewalk without a guardrail, it is considered probable that a pedestrian would go into the roadway. Therefore, for example, the controller 5 determines that the danger level of a position at which the guardrail is not located is higher than a position at which the guardrail is located. For example, the controller 5 determines that the danger level of a position at which an abnormality has occurred in the guardrail is higher than a position at which there is no abnormality in the guardrail.

For example, the controller 5 determines the danger level of the sidewalk based on the presence or absence, the type, the height, and the installation state of the curb. A sidewalk with a curb is separated from a roadway by the curb. In a sidewalk with a curb, it is considered improbable that a pedestrian would stride over the curb and go into the roadway. In a sidewalk without a curb, it is considered probable that a pedestrian would go into the roadway. It is considered that the higher the height of the curb is, the more improbable that a pedestrian would stride over the curb and go into the roadway. Therefore, for example, the controller 5 determines that the danger level of a position at which the curb is not located is higher than a position at which the curb is located. For example, in a position at which the curb is located, the lower the height of the curb is, the higher the danger level the controller 5 determines. For example, the controller 5 determines that the danger level of a position at which an abnormality has occurred in the curb is higher than a position at which there is no abnormality in the curb.

For example, the controller 5 determines the danger level of the sidewalk based on the presence or absence, the type, and the installation state of the lateral groove. A sidewalk having a lateral groove at the boundary between the sidewalk and the road is separated from a roadway by the lateral groove. In a sidewalk having a lateral groove at the boundary between the sidewalk and the road, it is considered improbable that a pedestrian would stride over the lateral groove and go into the roadway. In a sidewalk having no lateral groove at the boundary between the sidewalk and the road, it is considered probable that a pedestrian would go into the roadway. Therefore, for example, the controller 5 determines that the danger level of a position at which the lateral groove at the boundary between the sidewalk and the road is not located is higher than a position at which the lateral groove is located. For example, the controller 5 determines that the danger level of a position at which an abnormality has occurred in the lateral groove is higher than a position at which there is no abnormality in the lateral groove. In a sidewalk with a lateral groove, it is considered probable that a pedestrian tries to avoid the lateral groove and goes into the roadway or walks on the roadway side. Therefore, for example, the controller 5 determines that the danger level of a position at which the lateral groove is located is higher than a position at which the lateral groove is not located.

For example, the controller 5 determines the danger level of the sidewalk based on the sidewalk width and state of the sidewalk width. If the sidewalk width is wide, the distance between the pedestrian and the roadway increases. In a sidewalk having a wide sidewalk width, it is considered improbable that a pedestrian would go into the roadway. In a sidewalk having a narrow sidewalk width, it is considered probable that a pedestrian would go into the roadway. Therefore, for example, the controller 5 determines that the danger level of a position at which the sidewalk width is narrow is higher than a position at which the sidewalk width is wide. For example, the controller 5 determines that the danger level of a position at which the sidewalk width is equal to or lower than a predetermined value is high.

For example, the controller 5 determines the danger level of the sidewalk based on the presence or absence of a crosswalk. At position around a crosswalk, it is considered more probable that a pedestrian would cross the road than at a position without a crosswalk. Therefore, for example, the controller 5 determines that the danger level of a position around a crosswalk is higher than a position without a crosswalk.

For example, the controller 5 determines the danger level of the sidewalk based on the presence or absence of the traffic light and the lighting state thereof. More specifically, for example, the controller 5 determines that the danger level of a position at which the traffic light is not located is higher than a position at which the traffic light is located. For example, the controller 5 determines that the danger level is high at the moment before and after the color of the traffic light is switched.

For example, the controller 5 determines the danger level of the sidewalk based on the presence or absence, the height, and the installation state of a pedestrian overpass. For example, the controller 5 determines that the danger level of a position on the pedestrian overpass is low.

For example, the controller 5 determines the danger level of the sidewalk based on the presence or absence of a construction, a dedicated area thereof, and a state of ensuing change of sidewalk or roadway. In a sidewalk in which a construction is implemented, it is considered probable that a pedestrian would go into the roadway. At a position where the sidewalk or the roadway has been changed, it is considered probable that a pedestrian would go into the roadway. Therefore, for example, the controller 5 determines that the danger level of a position in which a construction is implemented is higher than a position in which a construction is not implemented. For example, the controller 5 determines that the danger level of a position where the sidewalk or the roadway has been changed is higher than a position where the sidewalk or the roadway has not been changed.

For example, the controller 5 determines the danger level of the sidewalk based on the presence or absence of an accident, a dedicated area thereof, and a state of ensuing change of sidewalk or roadway. In a sidewalk in which an accident has occurred, it is considered probable that a pedestrian would go into the roadway. At a position where the sidewalk or the roadway has been changed, it is considered probable that a pedestrian would go into the roadway. Therefore, for example, the controller 5 determines that the danger level of a position where an accident has occurred is higher than a position where there is no accident. For example, the controller 5 determines that the danger level of a position where the sidewalk or the roadway has been changed is higher than a position where the sidewalk or the roadway has not been changed.

For example, the controller 5 determines the danger level of the sidewalk based on the presence or absence of a stopping or parking vehicle, an obstacle, a dedicated area thereof, and a state of ensuing change of sidewalk or roadway. In a sidewalk with a stopping or parking vehicle or an obstacle, it is considered probable that a pedestrian would go into the roadway. At a position where the sidewalk or the roadway has been changed, it is considered probable that a pedestrian would go into the roadway. Therefore, for example, the controller 5 determines that the danger level of a position with a stopping or parking vehicle or an obstacle is higher than a position without a stopping or parking vehicle or an obstacle. For example, the controller 5 determines that the danger level of a position where the sidewalk or the roadway has been changed is higher than a position where the sidewalk or the roadway has not been changed.

For example, the controller 5 determines the danger level of the sidewalk based on the presence or absence of the pedestrian and cyclist, the number thereof, information on whether a child and an elderly person are included among pedestrians, and a state of unexpected appearance of pedestrian and cyclist and the like. More specifically, for example, the controller 5 determines that the danger level of a position with a pedestrian and a cyclist is higher than a position without a pedestrian and a cyclist. For example, the greater the number of pedestrians or cyclists is, the higher the danger level the controller 5 determines. For example, the controller 5 determines that the danger level is high if the numbers of pedestrians or cyclists is equal to or greater than the predetermined value. For example, the controller 5 determines that the danger level is higher in the case where a child or an elderly person is included among the pedestrians than in the case where no child or elderly person is included therein. For example, the controller 5 determines that the danger level is higher in the case where there is the state of unexpected appearance of a pedestrian or a cyclist than in the case where there is no state of unexpected appearance of a pedestrian or a cyclist.

The controller 5 stores the state of the sidewalk and the danger level (step S13). More specifically, the controller 5 stores the determined state of the sidewalk and the determined danger level of the sidewalk as sidewalk data 4B.

The controller 5 outputs the state and the danger level of the sidewalk (step S14). More specifically, the controller 5 outputs the determined state and the danger level of the sidewalk to at least one of the in-vehicle device 110 and the smartphone 200 via the communication unit 2.

The controller 5 may output the determined state and the danger level of the sidewalk without processing. For example, the controller 5 may output the determined state and the danger level of the sidewalk to at least one of the in-vehicle device 110 and the smartphone 200 regardless of the danger level. Alternatively, the controller 5 may output the determined state and the danger level of the sidewalk for the position in which it is determined that the danger level satisfies the predetermined condition to at least one of the in-vehicle device 110 and the smartphone 200 regardless of the danger level.

The controller 5 may output information obtained by processing the determined state and the danger level of the sidewalk. For example, the controller 5 may output information on a pedestrian and the danger level of the sidewalk on which the pedestrian walking to at least one of the in-vehicle device 110 and the smartphone 200 regardless of the danger level. Alternatively, it is determined that a pedestrian is present on a sidewalk in which the danger level satisfies a predetermined condition, the controller 5 may output information on the pedestrian walking in a position in which it is determined that the danger level satisfies the predetermined condition to at least one of the in-vehicle device 110 and the smartphone 200.

In the first embodiment, the information on a pedestrian is information on the pedestrian determined based on the image in step S11. Information on pedestrian includes information on the presence or absence, the number, and the position of a pedestrian, whether a child or an elderly person is included among pedestrians, and information on the state of unexpected appearance.

Therefore, the controller 5 determines the state of sidewalk in the vicinity of the subject-device, and transmits the determined state of sidewalk to at least one of the in-vehicle device 110 and the smartphone 200 via the communication unit 2.

The controller 5 repeatedly executes the above-described processing procedure during activation of the roadside device 1, for example, at predetermined time intervals.

Next, the operations of the in-vehicle device 110 and the smartphone 200 in the case where the controller 5 outputs the state and the danger level of the sidewalk without processing will be described.

The in-vehicle device 110 may output the state and the danger level of the sidewalk received from the roadside device 1 without processing. For example, the in-vehicle device 110 may notify a driver of the state and the danger level of the sidewalk without processing. Alternatively, the in-vehicle device 110 may notify a driver of the state and the danger level of the sidewalk for the position in which it is determined that the danger level satisfies the predetermined condition. More specifically, for example, the in-vehicle device 110 receives the position of the sidewalk together with the state and the danger level of the sidewalk from the roadside device 1, or, the in-vehicle device 110 calculates its own position based on a signal from the positioning satellite, for example. For example, if it is determined that the subject vehicle 100 is traveling in the vicinity of a high danger level sidewalk based on the position of the subject vehicle 100 per se and the position of the sidewalk, the in-vehicle device 110 may notify the driver of the state and the danger level of the sidewalk. Alternatively, for example, if it is determined that a pedestrian is present on a high danger level sidewalk, the in-vehicle device 110 may notify the driver of the state and the danger level of the sidewalk.

The in-vehicle device 110 may output information obtained by processing the state and the danger level of the sidewalk received from the roadside device 1. For example, the in-vehicle device 110 may notify the driver of the information on a pedestrian and the danger level of the sidewalk on which the pedestrian walking regardless of the danger level. Alternatively, the in-vehicle device 110 may notify the driver of the information on a pedestrian and the danger level of the sidewalk on which the pedestrian walking for the position in which it is determined that the danger level satisfies the predetermined condition. For example, if a pedestrian is present on a high danger level sidewalk, the in-vehicle device 110 may notify the driver of the information on a pedestrian and the danger level of the sidewalk on which the pedestrian walking regardless of the danger level.

The smartphone 200 may output the state and the danger level of the sidewalk received from the roadside device 1 without processing. For example, the smartphone 200 may notify a user of the state and the danger level of the sidewalk regardless of the danger level. Alternatively, the smartphone 200 may notify the user of the state and the danger level of the sidewalk for the position in which it is determined that the danger level satisfies the predetermined condition. More specifically, for example, the smartphone 200 may notify a user of the state and the danger level of the sidewalk, if moving in the vicinity of a high danger level sidewalk.

The smartphone 200 may output information obtained by processing the state and the danger level of the sidewalk received from the roadside device 1. For example, the smartphone 200 may notify the user of the processed information regardless of the danger level. Alternatively, the smartphone 200 may notify the user of the processed information, if moving in a position in which it is determined that the danger level satisfies the predetermined condition.

Next, the operations of the in-vehicle device 110 and the smartphone 200 in the case where the controller 5 outputs the information obtained by processing the state and the danger level of the sidewalk will be described.

For example, the in-vehicle device 110 may notify the driver of the processed information received from the roadside device 1 regardless of the danger level. Alternatively, the in-vehicle device 110 may notify the driver of the processed information received from the roadside device 1 for the position in which it is determined that the danger level satisfies the predetermined condition. More specifically, for example, the in-vehicle device 110 may notify the driver of the processed information received from the roadside device 1 if traveling in the vicinity of a sidewalk that is determined to have the high danger level. Alternatively, for example, if a pedestrian is present on a high danger level sidewalk, the in-vehicle device 110 may notify the driver of the processed information received from the roadside device 1 if raveling in the vicinity of a sidewalk that is determined to have the high danger level.

The smartphone 200 may output information obtained by processing the state and the danger level of the sidewalk received from the roadside device 1. For example, the smartphone 200 may notify the user of the processed information regardless of the danger level. Alternatively, the smartphone 200 may notify the user of the processed information, when walking in a position in which it is determined that the danger level satisfies the predetermined condition.

According to the first embodiment, the roadside device 1 can accurately determine the safety of the sidewalk and update the sidewalk data 4B based on the image photographed by the camera 3. Therefore, the roadside device 1 can automatically update the sidewalk data 4B instead of a manual operation.

On the other hand, manually registering the state of the sidewalk is troublesome and time consuming. Moreover, manually registering the state of the sidewalk changing constantly is hardly practicable.

However, the roadside device 1 can determine the state of the sidewalk changing constantly based on the images photographed by the camera 3. Such a roadside device 1 can also be used in traffic control, monitoring of congestion situation, and the like.

When the roadside device 1 is newly installed, there is no need to manually register the state of sidewalk, and the roadside device 1 can accurately determine the safety of the sidewalk and construct the sidewalk data 4B by only installing and starting thereof. Therefore, the roadside device 1 can be newly installed with ease.

The roadside device 1 has a simple configuration including the camera 3, the control program 4A stored in the storage portion 4, and the controller 5 for executing the control program 4A. Therefore, the roadside device 1 can be realize with ease and at low cost.

The roadside device 1 can output information to the in-vehicle device 110 if the danger level of the sidewalk is high and a driver needs attention. The roadside device 1 can output information to the smartphone 200 if the danger level of the sidewalk is high and a pedestrian needs attention. The in-vehicle device 110 can output information to the driver if the danger level of the sidewalk is high and the driver needs attention. The smartphone 200 can notify information if the danger level of the sidewalk is high and a user needs attention. Accordingly, the first embodiment can output necessary information when necessary. In other words, the first embodiment can suppress excessive operations.

Second Embodiment

Figure 6:
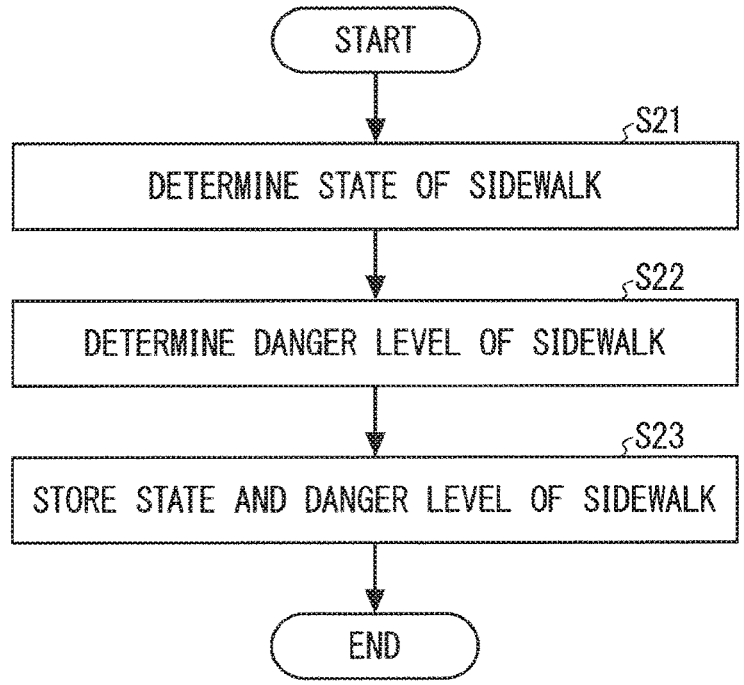
FIG. 6 illustrates a flowchart showing an example of control performed by the roadside device according to the second embodiment.
Figure 7:
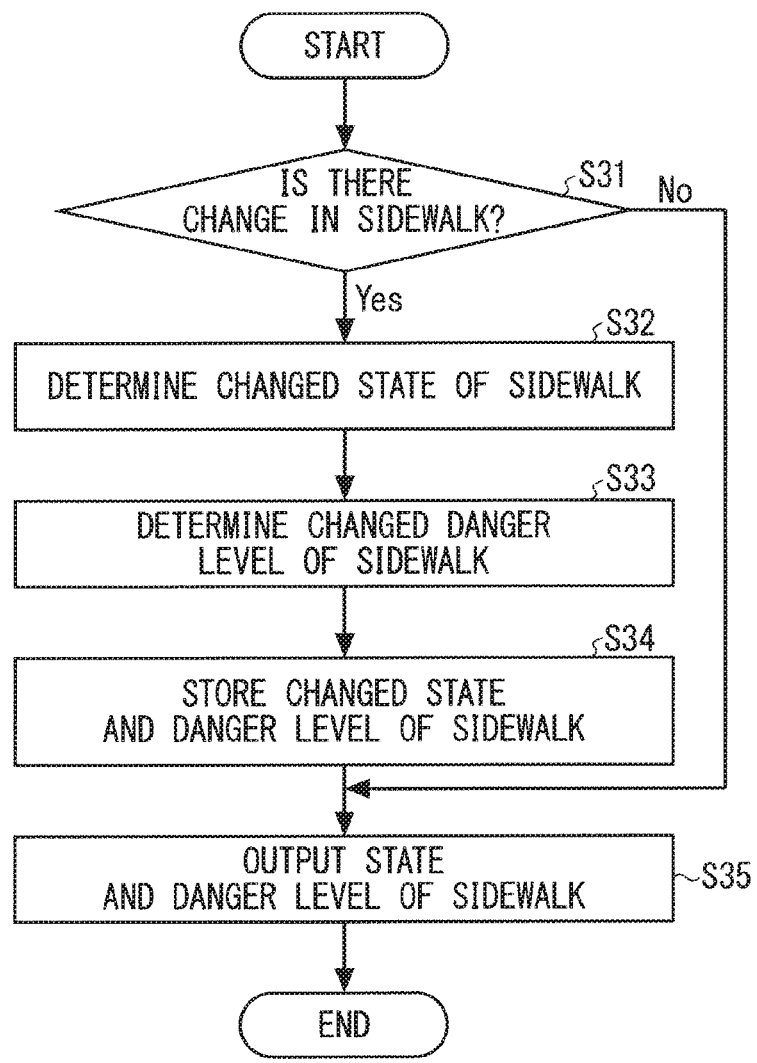
FIG. 7 illustrates a flowchart showing another example of control performed by the roadside device according to the second embodiment.

Referring to FIGS. 6 and 7, the overall configuration of a control system 10 including the roadside device 1 will be described. FIG. 6 illustrates a flowchart showing an example of control performed by the roadside device 1. FIG. 7 illustrates a flowchart showing another example of control performed by the roadside device 1. The basic configuration of the control system 10 including the roadside device 1 is the same as that of the control system 10 including the roadside device 1 of the first embodiment. In the following description, the same reference numerals or corresponding reference numerals are attached to the same constituent elements as those of the first embodiment, and a detailed description thereof will be omitted.

The controller 5 of the roadside device 1 implements an initial setup mode and a function as a normal mode.

The initial setup mode is executed once, for example, when newly installing the roadside device 1. The initial setup mode performs initial setup of the roadside device 1. More specifically, the initial setup mode initially constructs sidewalk data 4B.

The normal mode is executed after execution of the initial setup mode.

The control method of the roadside device 1 and the control program 4A and the action thereof in the initial setup mode will be described.

In the initial setup mode, the controller 5 executes the processing of the flowchart illustrated in FIG. 6. Steps S21 to S23 of the flowchart illustrated in FIG. 6 are the same process as steps S11 to S13 of the flowchart illustrated in FIG. 5.

Therefore, the controller 5 initially constructs the sidewalk data 4B in the initial setup mode.

In the normal mode, the controller 5 executes the processing of the flowchart illustrated in FIG. 7. Step S35 in the flowchart illustrated in FIG. 7 is the same process as step S14 in the flowchart illustrated in FIG. 5.

The controller 5 determines whether there is a change in the sidewalk (step S31). More specifically, the controller 5 determines the presence or absence of a change in the image of the sidewalk based on the latest image captured by the camera 3 and the immediately preceding image. More specifically, the controller 5 determines the presence or absence of a change in objects position in the sidewalk or in the vicinity of the sidewalk including a guardrail, a curb, a lateral groove, a sidewalk width, a crosswalk, a traffic light, a pedestrian overpass, a construction site, an accident site, a stopping and parking vehicle and an obstacle, and pedestrians and cyclists.

If the controller 5 determines that there is a change in the sidewalk (Yes in step S31), the controller 5 proceeds to step S32. If the controller 5 determines that there is no change in the sidewalk (No in step S31), the controller 5 proceeds to step S35.

The controller 5 determines the state of the changed sidewalk (step S32). More specifically, the controller 5 determines the state of the sidewalk determined to have changed, for a change in objects position in the sidewalk or in the vicinity of the sidewalk including a guardrail, a curb, a lateral groove, a sidewalk width, a crosswalk, a traffic light, a pedestrian overpass, a construction site, an accident site, a stopping and parking vehicle and an obstacle, and pedestrians and cyclists.

The controller 5 determines the danger level of the changed sidewalk (step S33). The controller 5 determines the danger level of the sidewalk based on the determined state of the sidewalk in step S32.

The controller 5 stores the changed state of the sidewalk and the changed danger level (step S34). More specifically, the controller 5 stores the determined state of the changed sidewalk and the determined danger level of the changed sidewalk as sidewalk data 4B.

The controller 5 outputs the state of sidewalk and the danger level (step S35).

According to the second embodiment, when the roadside device 1 is newly installing, the roadside device 1 can accurately determine the safety of the sidewalk and initially construct the sidewalk data 4B based on the image photographed by the camera 3. After execution of the initial setup mode, the roadside device 1 can accurately determine the safety of the sidewalk and update the sidewalk data 4B based on the image photographed by the camera 3, if there is a change in the state of sidewalk. Therefore, the roadside device 1 can automatically update the difference in the changed sidewalk data 4B instead of a manual operation.

The above embodiments of the present application can be appropriately changed within a scope not to impair the gist of the present disclosure. Further, the above embodiments and modifications disclosed in the present application can be appropriately combined among thereof. For example, the above embodiments can be modified as follows.

The case where the state of a sidewalk is determined based on the image photographed by the camera 3 has been described. However, for example, the state of the sidewalk may be determined by using information detected by another detector such as a microwave radar or a millimeter wave radar.

Although a smartphone has been described as an example of a portable electronic device carried by a pedestrian, it is not limited to a smartphone but may be a portable electronic device other than a smartphone. The electronic device, for example includes, but not limited to, a mobile phone, a tablet, a portable personal computer, a digital camera, a media player, an electronic book reader, a satellite navigation system, and a game console.

In the above embodiments, the roadside device 1 has been described as a unit for determining the danger level of a sidewalk, but the danger level of a sidewalk may be determined by the in-vehicle device 110 or the smartphone 200. In this case, the roadside device 1 determines the state of the sidewalk and outputs the determined state of the sidewalk to the in-vehicle device 110 or the smartphone 200. The in-vehicle device 110 or the smartphone 200 determines the danger level of the sidewalk based on the received state of sidewalk. The in-vehicle device 110 or the smartphone 200 performs processing according to the determined danger level of the sidewalk. Thereby, the processing load on the roadside device 1 can be reduced.

The controller 5 may perform the determination of the pedestrian or the cyclist not based on the image but by obtaining information that can determine a movement state by communicating with the smartphone 200 carried by the pedestrian or the cyclist. Thereby, the controller 5 can more reliably determine the pedestrian or the cyclist. The movement state is represented by, for example, a moving direction and a moving speed of the pedestrian or the cyclist. Further, the controller 5 may obtain information such as the position of the smartphone 200 and age information of the user (pedestrian or cyclist) of the smartphone 200 from the smartphone 200.

Furthermore, the controller 5 may detect the voice with the microphone of the roadside device 1, and more accurately determine whether the pedestrian includes a child or an elderly person.

When the controller 5 outputs the state and the danger level of the sidewalk, controller 5 may perform communication having directivity via the communication unit 2. In this manner, the roadside device 1 can output the determined state and the danger level of the sidewalk to at least one of the in-vehicle device 110 and the smartphone 200 approaching the sidewalk.

A plurality of embodiments have been described for explicit disclosure of the roadside device. However, the roadside device should not be limited to the above-described embodiments, and should be configured to embody the configuration in which all modifications and alternatives that can be created by those skilled in the art within the scope of the basic matter described in the specification are applicable.

The invention claimed is:

1. A roadside device, comprising:
   a detector configured to detect first information for determining a state of a sidewalk around the roadside device;
   a communication unit configured to communicate with at least one of an in-vehicle device and a mobile device held by a pedestrian device; and
   at least one processor configured to determine the state of the sidewalk around the roadside device based on the first information, and transmit second information based on the determined state of the sidewalk to the at least one of the in-vehicle device and the mobile device, the state of the sidewalk including any one of a state of hardware structure of the sidewalk, presence or absence of a construction site and dedicated area of the construction site and a state of ensuing change of roadway as well as presence or absence of an accident and dedicated area of the accident and a state of ensuing change of roadway, the state of hardware structure of the sidewalk including at least one of presence or absence of abnormality of a guardrail, height of a curb, presence or absence of abnormality of the curb, presence or absence of a lateral groove, or presence or absence of abnormality of the lateral groove.

2. The roadside device according to claim 1, wherein
   the detector includes a camera configured to photograph an image around the roadside device that includes the sidewalk, and
   the at least one processor is configured to determine the state of the sidewalk around the roadside device based on the image photographed by the detector, and transmit the second information based on the determined state of the sidewalk to the at least one of the in-vehicle device and the mobile device.

3. The roadside device according to claim 1, wherein
   the first information for determining the state of the sidewalk includes information for determining a danger level of the sidewalk, and
   the at least one processor is configured to determine the danger level of the sidewalk based on the determined state of the sidewalk, and transmit the determined danger level of the sidewalk to the at least one of the in-vehicle device and the mobile device.

4. The roadside device according to claim 3, wherein,
   when the danger level of the sidewalk satisfies a predetermined condition based on the determined danger level of the sidewalk, the at least one processor is configured to transmit at least one of the state of the sidewalk and the danger level of the sidewalk to the at least one of the in-vehicle device and the mobile device.

5. The roadside device according to claim 3, wherein,
   when a pedestrian is present on the sidewalk in which the danger level of the sidewalk satisfies the predetermined condition based on the determined danger level of the sidewalk, the at least one processor is configured to transmit at least any of the state of the sidewalk, the danger level of the sidewalk, and information on the pedestrian to the at least one of the in-vehicle device and the mobile device.

6. A method of controlling a roadside device, comprising:
   detecting first information for determining a state of a sidewalk around the roadside device;
   determining the state of a sidewalk around the roadside device based on the detected first information; and
   transmitting second information based on the determined state of the sidewalk to at least one of an in-vehicle device and a mobile device held by a pedestrian, the state of the sidewalk including any one of a state of hardware structure of the sidewalk, presence or absence of a construction site and dedicated area of the construction site and a state of ensuing change of roadway as well as presence or absence of an accident and dedicated area of the accident and a state of ensuing change of roadway, the state of hardware structure of the sidewalk including at least one of presence or absence of abnormality of a guardrail, height of a curb, presence or absence of abnormality of the curb, presence or absence of a lateral groove, or presence or absence of abnormality of the lateral groove.

7. A non-transitory computer-readable storage medium storing a control program for controlling a roadside device to execute the steps of:

detecting first information for determining a state of a sidewalk around the roadside device;

determining the state of a sidewalk around the roadside device based on the detected first information; and transmitting second information based on the determined state of the sidewalk to at least one of an in-vehicle device and a mobile device held by a pedestrian, the state of the sidewalk including any one of a state of hardware structure of the sidewalk, presence or absence of a construction site and dedicated area of the construction site and a state of ensuing change of roadway as well as presence or absence of an accident and dedicated area of the accident and a state of ensuing change of roadway, the state of hardware structure of the sidewalk including at least one of presence or absence of abnormality of a guardrail, height of a curb, presence or absence of abnormality of the curb, presence or absence of a lateral groove, or presence or absence of abnormality of the lateral groove.

8. The method according to claim 6, comprising:

photographing an image around the roadside device that includes the sidewalk;

determining the state of the sidewalk around the roadside device based on the image; and transmitting the second information based on the determined state of the sidewalk to the at least one of the in-vehicle device and the mobile device.

9. The method according to claim 6, wherein the first information for determining the state of the sidewalk includes information for determining a danger level of the sidewalk, further comprising:

determining the danger level of the sidewalk based on the determined state of the sidewalk; and transmitting the determined danger level of the sidewalk to the at least one of the in-vehicle device and the mobile device.

10. The method according to claim 9, wherein when the danger level of the sidewalk satisfies a predetermined condition based on the determined danger level of the sidewalk, further comprising:

transmitting at least one of the state of the sidewalk and the danger level of the sidewalk to the at least one of the in-vehicle device and the mobile device.

11. The method according to claim 9, wherein when a pedestrian is present on the sidewalk in which the danger level of the sidewalk satisfies the predetermined condition based on the determined danger level of the sidewalk, further comprising:

transmitting at least any of the state of the sidewalk, the danger level of the sidewalk, and information on the pedestrian to the at least one of the in-vehicle device and the mobile device.

12. The roadside device according to claim 1, wherein the detector includes a camera configured to photograph an image around the roadside device that includes the sidewalk.

13. The roadside device according to claim 1, wherein the at least one processor is configured to determine the danger level of the sidewalk based on the determined state of the sidewalk.

14. The roadside device according to claim 13, wherein the state of hardware of the sidewalk includes a state relating to a guardrail, and the at least one processor is configured to determine that the danger level of the sidewalk without the guardrail is higher than that of the sidewalk with the guardrail.

15. The roadside device according to claim 1, wherein the at least one processor is configured to transmit the second information based on the determined state of the sidewalk to the mobile device.

16. The roadside device according to claim 15, wherein the at least one processor is further configured to transmit the second information based on the determined state of the sidewalk to the in-vehicle device.

\* \* \* \* \*